Figure 1:
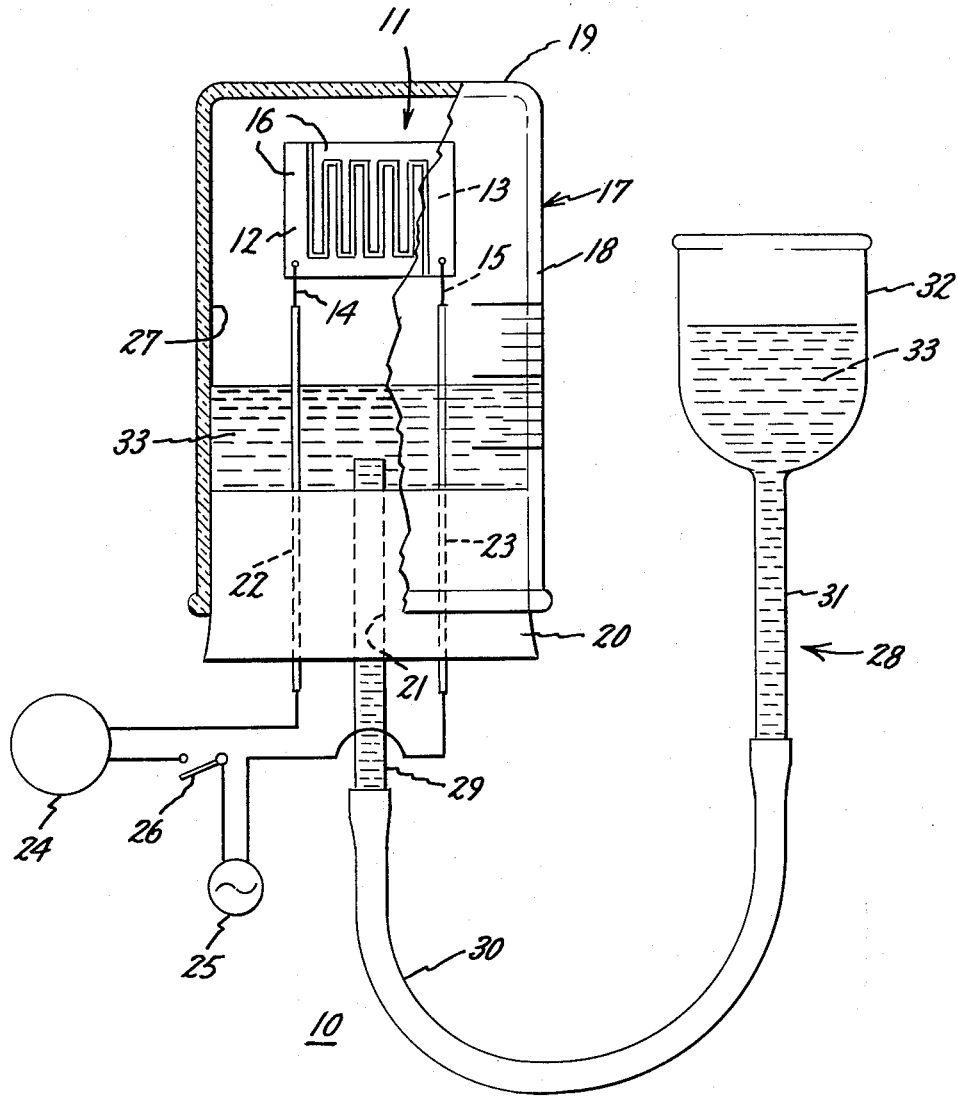

United States Patent [19]
Interrante et al.

[11] 3,820,402
[45] June 28, 1974

[54] ELECTRICAL PRESSURE TRANSDUCER

[75] Inventors: Leonard V. Interrante, Schenectady; Stephan P. Mitoff, Elnora, both of N.Y.

[73] Assignee: General Electric Company, Schenectady, N.Y.

[22] Filed: Mar. 20, 1973

[21] Appl. No.: 343,137

[52] U.S. Cl. ............ 73/398 AR, 73/141 R, 73/410, 338/41
[51] Int. Cl. ............................................ G01l 9/02
[58] Field of Search ....... 73/398 AR, 410, 384, 406, 73/335, 141 R; 338/35, 36, 41, 42

[56] References Cited
UNITED STATES PATENTS
2,914,948  12/1959  Prentiss .......................... 73/398 AR Primary Examiner—Donald O. Woodiel
Attorney, Agent, or Firm—Paul R. Webb, II; Joseph T. Cohen; Jerome C. Squillaro

[57] ABSTRACT

An electrical pressure transducer is described which responds to total pressure changes by variations in relative humidity changing the electrical impedance of a humidity sensing element. The pressure transducer has a sensing element which is sensitive to relative humidity, an enclosure surrounding the sensing element, a pair of electrical leads extending outwardly from the enclosure, a gas with a relative humidity within the enclosure, and pressure means associated with the enclosure to change the volume of the confined gas thereby varying the relative humidity of the gas.

5 Claims, 2 Drawing Figures

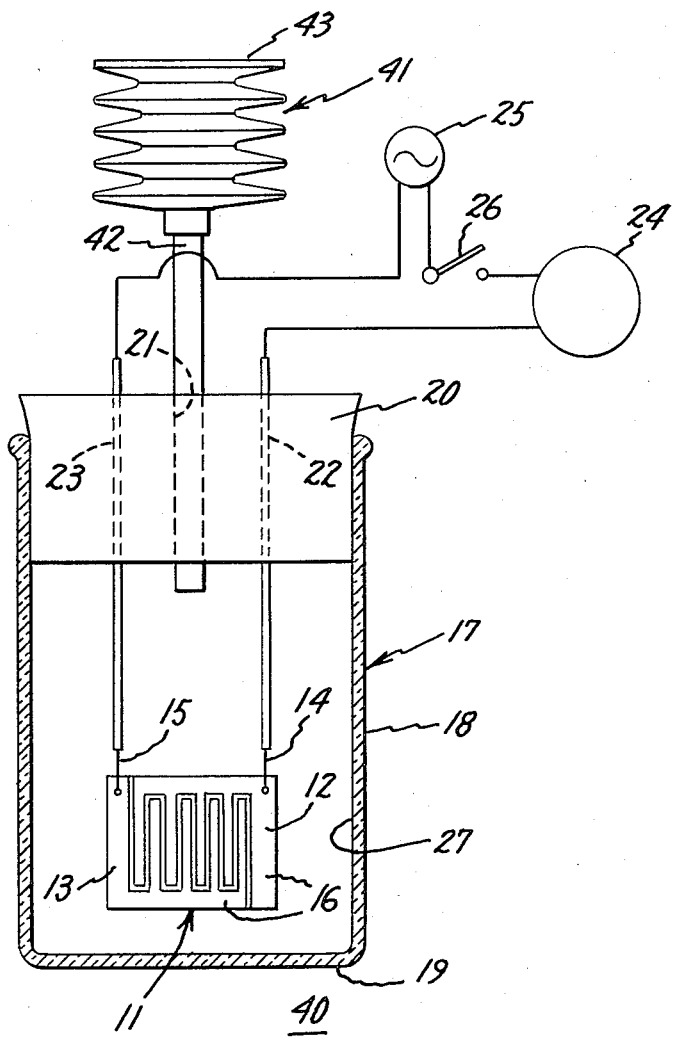

ELECTRICAL PRESSURE TRANSDUCER

This invention relates to electrical pressure transducers and, more particularly, to such electrical pressure transducers which respond to total pressure changes by variations in relative humidity changing the electrical impedance of a humidity sensing element.

The most recent issue of the *ISA Transducer Compendium*, E. T. Minnar, Editor, Plenum Press, New York 1969, lists over 35 different pressure transducers effective in the range of 1 to 100 psi. Most of these depend on the deflection or deformation of some elastic device in response to the pressure. This is usually a diaphragm, Bourdon tube, a piston-cylinder device or bellows, which acts on some electrical sensing element. The latter may be a strain gauge, potentiometer, a piezoelectric element, variable capacitor, variable inductance device or a differential transformer. An important advance in pressure transducers has been the introduction of the semiconductor strain gauge which resulted in signal levels greater by at least an order of magnitude than previously known.

In spite of the above advances, and the large number of devices currently available, there is a continuing need for new types of pressure transducers, particularly ones which will meet the key requirements of high sensitivity, small size and low cost. Additional desirable characteristics of pressure transducers in this pressure range are a short response time to pressure changes, negligibly small drift, no change in sensitivity with time, and sensitivity independent of the absolute pressure.

None of the pressure transducers in the abovementioned *ISA Transducer Compendium* possess all of these characteristics to a sufficient degree and, in particular, few of them are in a cost range appropriate to most large volume applications. Further, most of them are not subject to miniaturization and are limited by a linear input/output curve, i.e. % change in signal/% change in pressure is equal to unity.

Our invention is directed to an improved type of electrical pressure transducer which overcomes many of the above prior art problems.

The primary objects of our invention are to provide an electrical pressure transducer which measures total pressure changes by variations in the relative humidity of a gaseous medium.

In accordance with one aspect of our invention, an electrical pressure transducer includes a humidity sensing element, a gaseous medium with a relative humidity surrounding the sensing element, and pressure means to vary the relative humidity of the gaseous medium.

These and various other objects, features and advantages of the invention will be better understood from the following description taken in connection with the accompanying drawing in which:

FIG. 1 is an elevational view, partially in section, of an electrical pressure transducer made in accordance with our invention; and FIG. 2 is an elevational view, partially in section, of a modified electrical pressure transducer.

In FIG. 1 of the drawing, there is shown generally at 10 an electrical pressure transducer made in accordance with our invention. Transducer 10 is shown with a humidity sensing element 11 which responds to variations in atmospheric water content by changes in elecrical impedance. Sensing element 11 is provided with an electrically insulating dense alumina substrate (not shown) and a pair of spaced apart interdigitated electrodes 12 and 13 mounted on one surface of substrate 12. Electrically insulated electrical leads 14 and 15 are in contact with electrodes 12 and 13, respectively. A thin film 16 of chloromethylated quaternized polystyrene containing from 3.3 to 8.6 percent chlorine adheres to the electrode surface comprising electrodes 12 and 13, and the surface of substrate 12 between the electrodes.

A variety of electrically insulating substrates can be employed in our sensor. However, we prefer to employ a dense alumina substrate. Electrodes 12 and 13 are preferably formed by having a gold layer affixed to the substrate which is silk-screened onto the substrate and fired using standard firing methods to provide the pair of electrodes. Various other materials and methods of applying these materials can, of course, be used to produce the electrodes on the substrate. An electrical lead is connected to each of the electrodes in any suitable manner. The electrode surface is coated with a thin film of preferably 6 microns of chloromethylated quaternized polystyrene by spraying with a 0.6% solution in 1:1 chloroform:methanol solvent whereby the film adheres to the electrode surface. The preferred amount of polymer for an electrode surface with dimensions of 1 inch × 1 inch is 3 milligrams. The surface spacing between the interdigitated electrodes can be readily varied to meet specific requirements of resistance range and relative humidity (RH) versus impedance characteristics.

The above sensing element is more fully described and claimed in U.S. letters Pat. No. 3,703,696 issued on Nov. 21, 1972, under the title "Humidity Sensor" in the names of Kenneth W. Browall and Leonard V. Interrante. This patent is assigned to the same assignee as the present application. The subject patent is hereby incorporated by reference into the present application.

A gas-tight enclosure 17 surrounds sensing element 11. Enclosure 17 is shown as comprising a glass cylinder portion 18, a glass cover portion 19 secured to the upper end of cylinder portion 18 as an integral part thereof, and a rubber stopper 20 closing the lower end of cylinder portion 18. Rubber stopper 20, which can be made further gas type by use of a silicone sealer therearound, has a central aperture therethrough 21 and smaller apertures 22 and 23 which smaller apertures accommodate insulated electrical leads 14 and 15 for extension of these leads outside the transducer. Leads 14 and 15 are connected across a reading device 24 such as an AC bridge 24 or a direct reading AC resistance device. An AC power supply 25 and a switch 26 is included in the circuit. The interior surface 27 of enclosure 17 defines further a chamber which is filled with a gas such as air having a specific relative humidity. Pressure means are shown generally at 28 which includes a glass tube 29 positioned within opening 21 of rubber stopper 20 and extending into chamber 27. A piece of rubber tubing 30 is shown connected to glass tube 29 and at its opposite end to a glass tube 31 having an integral part thereof at its upper end an open glass vessel 31. Pressure means 28 includes further mercury 33 which is shown contained in chamber 27, tube 29, tube 30, tube 31 and glass vessel 32. The above structure is an electrical pressure transducer made in accordance with our invention.

In the operation of the transducer shown in FIG. 1 of the drawing, pressure means 28 is associated with enclosure 17 to change the volume of the confined gas within chamber 27 thereby varying the relative humidity of the gas and changing the electrical impedance of sensing element 11. In the particular embodiment shown in FIG. 1, the pressure is increased in enclosure 17 by moving vessel 32 upwardly whereby mercury 33 within chamber 27 of enclosure 17 moves upwardly exerting pressure against the gas with a specific relative humidity within chamber 27. As the pressure is increased within the rigid enclosure 17, the volume of the gas in chamber 27 is decreased and the relative humidity is increased. In accordance with our invention when the relative humidity increases, sensing element 11 becomes more conductive and less resistant thereby providing a reading from device 24. Similarly, as pressure means 28 are activated in the reverse direction whereby the pressure is lowered, mercury 33 is lowered within enclosure 17 thereby increasing the volume of the gas in chamber 27. Upon the volume increase the relative humidity is lowered thereby increasing the resistance of sensing element 11 and lowering its conductivity which can also be measured on device 24. Transducer 10 employs a gas therein with a relative humidity therein which will respond to pressure changes. Further, the specific relative humidity can be predetermined whereby response is provided within a specific pressure range. In this latter manner an unlimited number of specific pressure ranges can be measured with such a device.

In FIG. 2 of the drawing there is shown a modified electrical pressure transducer 40 made in accordance with our invention. This transducer is similar to the transducer shown in FIG. 1 but it will be noted that it is an upright position or inverted from the structure shown in FIG. 1. Numbers have been applied in FIG. 2 which are similar to numbers in FIG. 1 for identical parts. Tranducer 40 has an enclosure 17 made of a glass enclosure 18 with a glass cover 19 secured to the lower end of cylinder 18, and a rubber stopper 20 closing the upper end of cylinder 18.

Humidity sensing element 11 as described previously in FIG. 1 is positioned within chamber 27 and enclosure 17. A pair of leads 14 and 15 are connected to sensing element 11 and extend through a pair of openings 22 and 23 in stopper 20. The leads are connected across reading device 24 at the opposite end. A power supply 25 and switch 26 are supplied in the circuit. A central aperture 21 is provided in stopper 20. A gas such as air with a specific relative humidity is contained within chamber 26 of enclosure 17. Pressure means are shown generally at 41 which comprise a tube 42 extending through cover 20 and communicating with chamber 27 of enclosure 17. On the opposite end of tube 42 a bellows 43 is connected therewith.

The transducer 40 of FIG. 2 operates in the same manner as described above transducer 10 in FIG. 1. The difference between the two structures is pressure means 28 are employed in FIG. 1 while modified pressure means are employed in FIG. 2. When bellows 43 is depressed the pressure within chamber 27 is increased thereby decreasing the volume of the air therein. When the volume of air decreases the relative humidity of the air is increased thereby increasing the conductivity of sensing element 11 and reducing its existence. Such changes by deflection of the bellows are measured by reading device 24.

We found that we could form an electrical pressure transducer by employing a humidity sensing element responsive to variations in atmospheric water by changes in electrical impedance, such as electrical resistance. Our preferred sensing element is the humidity sensor described and claimed in the above-discussed U.S. letters Pat. No. 3,703,696 which has been incorporated herein by reference. Various other humidity sensing elements can be used in our transducer. Suitable humidity sensing elements include humidity sensors described in the above-discussed *ISA Transducer Compendium*. The gas-tight enclosure can be formed in a variety of configurations and in a wide variety of materials. Various gases with a relative humidity or with a predetermined relative humidity from a wide range are suitable. However, we prefer to use simply air with a predetermined relative humidity of 5 to 30 percent. The pressure means which include a wide variety of elements and materials, are for the purpose of changing the gas volume. As this volume is reduced by increasing pressure the relative humidity is increased. Correspondingly, the electrical resistance of the sensor decreases and the electrical conductivity increases. As the volume of air is subsequently increased by decreasing the pressure the relative humidity is decreased. Correspondingly, the electrical resistance of the sensor increases and the electrical conductivity decreases. As it was pointed out above, the pressure means is to change the gas volume within a container while the container is preferably made of a rigid material whereby the volume can be easily decreased or increased. A flexible container or enclosure can also be used provided volume can be changed. As it was mentioned above in connection with the *ISA Transducer Compendium* various pressure means are available for exerting pressure upon an electrical sensing element. In the present invention such pressure means may be employed, such as a diaphragm, Bourdon tube, a piston-cylinder device or a bellows, etc. However, in the present invention the pressure means does not exert pressure against an electrical sensing element as mentioned in the above issue of *ISA Transducer Compendium*. As opposed to the approach of the pressure means exerting a pressure against an electrical sensing element, the present invention requires the pressure means to exert a pressure against a volume of gas, which contains relative humidity or a predetermined relative humidity whereby upon decrease of the volume the relative humidity increases and upon increase of the volume to its initial state relative humidity decreases. Further, in the present invention the increased relative humidity caused by the decrease in volume increases the conductivity and decreases the resistance. In this manner we have found that we are able uniquely to determine a change in pressure or an unknown pressure within a particular pressure range. The accuracy of the device determining the unknown pressure depends on the accuracy of the humidity sensing element. The predetermined relative humidity can be varied as well as the gas to cover an almost unlimited number of pressure ranges thereby providing a device having general application. The humidity sensing element is connected to an appropriate device, for example, an AC bridge or a direct reading AC resistance device to measure the resistance.

We found further that we could employ a particular gas, and a particular relative humidity therein whereby we could determine the pressure over a particular desired pressure range. Such an instrument can be calibrated in a simple manner by changing the pressure from the pressure means over a number of known values and recording the resistance therefor. The resulting device which contains a specific humidity sensing element, particularly gas, and a specific relative humidity percentage therein will then provide a pressure reading by means of a corresponding resistance or by means of a direct reading by calibrating a scale which is connected to the leads of the sensing element. As mentioned above, the accuracy of such a device depends on the accuracy of the humidity sensing element.

Examples of electrical pressure transducers which were made in accordance with our invention are set forth below.

EXAMPLE I

An electrical pressure transducer was formed in which the transducer was provided with a humidity sensing element made in accordance with the above-mentioned U.S. letters Pat. No. 3,703,696. The sensing element was formed from a 0.025 inch thick electrically insulating dense alumina substrate with each major surface of 1.0 inch. The interdigitated electrodes were formed by silk-screening onto the surface of the substrate using gold paint which was fired subsequently. The electrode separations were of 0.015 inch. An electrical lead was soldered to each of the pair of electrodes. The associated surface of the electrode and the substrate surface therebetween formed an electrode surface which surface was coated with a thin film of approximately 6 microns of chloromethylated quaternized polystyrene by spraying with a 0.6% solution in 1:1 chloroform:methanol solvent. The quantity of the above polymer for the one major surface of each of the above sensing elements was 3 milligrams.

A gas tight enclosure surrounded the sensing element. The enclosure comprised a graduated cylinder having a glass disc sealed integrally at its upper end and a rubber stopper closing the bottom opening. The stopper had two small apertures therein through which the lead wires were conducted from the interior to the exterior of the glass enclosure and connected to an AC bridge. A central opening was also provided which had a glass tube inserted therein. The enclosure was filled with air at 30% relative humidity. A rubber tube was connected to the opposite end of the glass tube which rubber tube had a glass stem vessel on the opposite end thereof. The glass vessel was filled with mercury thereby providing a manometer. The resulting device was an electrical pressure transducer made in accordance with our invention.

EXAMPLE II

The above electrical pressure transducer made in accordance with Example I was operated in accordance with our invention and calibrated at the same time. This was accomplished by measuring the absolute difference in the mercury levels in pressure vessel and the enclosure chamber in centimeters using a metric measuring rule. The pressure was varied by raising the pressure vessel relative to the chamber of the transducer enclosure which was held stationary. The pressure inside the transducer chamber was determined by measuring the absolute difference in the mercury levels in the chamber and the pressure vessel, in centimeters, by a centimeter calibrated rule. The pressure was raised in increments of about 0.05 atmosphere in the manner described above over the range of 1 atmosphere to 1.94 atmospheres. At each change in atmospheric pressure the corresponding resistance of the sensing element was measured using the AC bridge and recorded. The pressure in atmospheres to which the transducer was subjected and the resistance in ohms for each of these points is shown below in Table I.

TABLE I

| Pressure/Atmosphere | Resistance/Ohms |
|---|---|
| 1.00 | $1.44 \times 10^4$ |
| 1.06 | $1.35 \times 10^4$ |
| 1.12 | $1.24 \times 10^4$ |
| 1.19 | $1.13 \times 10^4$ |
| 1.28 | $1.02 \times 10^4$ |
| 1.34 | $9.45 \times 10^3$ |
| 1.42 | $8.48 \times 10^3$ |
| 1.51 | $7.46 \times 10^3$ |
| 1.63 | $6.07 \times 10^3$ |
| 1.75 | $4.76 \times 10^3$ |
| 1.94 | $3.16 \times 10^3$ |
| 1.94 | $2.82 \times 10^3$ |
| 1.82 | $3.07 \times 10^3$ |
| 1.69 | $3.38 \times 10^3$ |
| 1.55 | $4.16 \times 10^3$ |
| 1.40 | $5.09 \times 10^3$ |
| 1.27 | $6.10 \times 10^3$ |
| 1.15 | $8.38 \times 10^3$ |
| 1.00 | $1.12 \times 10^4$ |

In the above operation of the electrical pressure transducer, the pressure was increased from 1 atmosphere to 1.94 atmospheres in about 0.05 atmosphere increments every 20 to 30 minutes. When the pressure was at 1.94 atmospheres, the transducer was maintained at this pressure overnight. The second resistance measurement at 1.94 atmospheres was made the following morning. The pressure was then decreased every 20 to 30 minutes over increments from about 0.12 to 0.15 atmospheres until the pressure was lowered to 1 atmosphere. Thus, the resistance decreased as the pressure increased while the conductivity increased. Thus, as the pressure was decreased the volume increased while the resistance increased and the conductivity decreased.

It will thus be seen that the above transducer can be used to determine change in pressure and pressure for this specific device with this particular gas and relative humidity from a pressure source in the range of one atmosphere to 1.94 atmospheres. As the pressure increases or decreases within this range the calibrated resistance of the device is measured, for example, using the AC bridge showing what the unknown pressure is. If desired the resistance values can be converted to pressure values for direct read out of the pressure. As mentioned above, the accuracy of the transducer depends upon the accuracy of the humidity sensing element.

The absolute pressure limits to be measured will be determined by the relative humidity of the gas originally sealed in the device and the operating temperature. Thus, by choosing sufficiently high or low relative humidities, the effective pressure range of the transducer is virtually unlimited. The transducer has a considerable change in resistance with temperature which can be electrically compensated, for example, by the use of a second humidity sensor, sealed in an atmosphere of the same relative humidity, which would be exposed to the temperature change but not to any pressure changes.

EXAMPLE III

An electrical pressure transducer was also formed in which the transducer was provided with a humidity sensing element made in accordance with the above-mentioned U.S. letters Pat. No. 3,703,696. The sensing element was formed from a one-sixteenth inch thick electrically insulating glass-epoxy substrate with a copper layer affixed to one major surface which major surface was 1.0 inch × 1.25 inches. The interdigitated electrodes were formed by etching into the copper layer using standard photoresist method. The electrodes were then electroplated with a flash coating of gold approximately 1,000 Angstroms in thickness to protect the electrodes from oxidation. The electrode separations were of 0.015 inch. An electrical lead was soldered to each of the pair of electrodes. The associated surface of the electrode and the substrate surface therebetween formed an electrode surface which surface was coated with a thin film of chloromethylated quaternized polystyrene containing chloroform:methanol solvent. The quantity of the above polymer for the one major surface of each of the above sensing elements was 4 milligrams.

A gas tight enclosure surrounded each sensing element. The enclosure comprised a graduated cylinder having a glass disc sealed integrally at its upper end and a rubber stopper closing the bottom opening. The stopper had two small apertures therein through which the lead wires were conducted from the interior to the exterior of the glass enclosure and connected to an AC bridge. A central opening was also provided which had a glass tube inserted therein. The enclosure was filled with air at 30 percent relative humidity. A rubber tube was connected to the opposite end of the glass tube which rubber tube had a glass stem vessel on the opposite end thereof. The glass vessel was filled with mercury thereby providing a manometer. Each of the resulting devices was an electrical pressure transducer made in accordance with our invention.

EXAMPLE IV

The electrical pressure transducer made in accordance with Example III was operated in accordance with the invention and calibrated at the same time. The operation was identical to the operation set forth in Example II for the transducer of Example I. The pressure range was from 1 atmosphere to 1.97 atmospheres. The pressure in atmospheres to which the transducer was subjected and the resistance in ohms for each of these points is shown below in Table II.

TABLE II

| Pressure/Atmosphere | Resistance/Ohms |
|---|---|
| 1.00 | $3.9 \times 10^4$ |
| 1.06 | $3.4 \times 10^4$ |
| 1.10 | $3.2 \times 10^4$ |
| 1.18 | $2.7 \times 10^4$ |
| 1.26 | $2.3 \times 10^4$ |
| 1.36 | $1.9 \times 10^4$ |
| 1.49 | $1.6 \times 10^4$ |
| 1.64 | $1.3 \times 10^4$ |
| 1.78 | $1.0 \times 10^4$ |
| 1.97 | $8.0 \times 10^3$ |
| 1.82 | $9.5 \times 10^3$ |
| 1.69 | $1.1 \times 10^4$ |

TABLE II – Continued

| Pressure/Atmosphere | Resistance/Ohms |
|---|---|
| 1.54 | $1.4 \times 10^4$ |
| 1.40 | $1.8 \times 10^4$ |
| 1.26 | $2.4 \times 10^4$ |
| 1.15 | $3.2 \times 10^4$ |
| 1.00 | $5.4 \times 10^4$ |

In the above operation of the electrical pressure transducer, the pressure was increased from one atmosphere to 1.97 atmospheres and decreased again in small increments about every 15 minutes. The dense alumina substrate of the humidity sensing element in the device of Examples I and II was employed subsequently in view of a slow but significant increase in resistance with time which was observed with the device in Examples III and IV. This increase in resistance with time appears to be due to water absorption by the glass-epoxy substrate used in the device in Examples III and IV.

While other modifications of the invention and variations thereof which may be employed within the scope of the invention have not been described, the invention is intended to include such as may be embraced within the following claims:

What we claim as new and desire to secure by letters Patent of the United States is:

1. An electrical pressure transducer which comprises a humidity sensing element responsive to variations in atmospheric water content by electrical impedance changes, a gas-tight enclosure surrounding the sensing element, a pair of electrical leads connected to the sensing element and extending outwardly from the enclosure, a gas with a relative humidity confined within the gas-tight enclosure and in contact with the sensing element, and pressure means associated with the enclosure adapted to change the volume of the confined gas thereby varying the relative humidity of the gas and changing the electrical resistance of the sensing element.

2. An electrical pressure transducer as in claim 1, in which the electrical impedance changes are changes in electrical resistance.

3. An electrical pressure transducer as in claim 1, in which the gas has a predetermined relative humidity.

4. An electrical pressure transducer which comprises a humidity sensing element responsive to variations in atmospheric water content by electrical impedance changes comprising an electrically insulating substrate, a pair of spaced apart interdigitated electrodes positioned on one surface of the substrate, an electrical lead in contact with each of the electrodes, and a thin film of chloromethylated quaternized polystyrene containing from 3.3 to 8.6 percent chlorine adhering to the electrode surface of the sensor, a gas-tight enclosure surrounding the sensing element, the electrical leads extending from the electrode outwardly through the enclosure, a gas with a relative humidity confined within the gas-tight enclosure and in contact with the sensing element, and pressure means associated with the enclosure adapted to change the volume of the confined gas thereby varying the relative humidity of the gas and changing the electrical resistance of the sensing element.

5. An electrical pressure transducer as in claim 4, in which the electrically insulating substrate of the sensing element is a dense alumina.

* * * * *